United States Patent
Lee

(10) Patent No.: US 11,415,295 B2
(45) Date of Patent: Aug. 16, 2022

(54) LAMP FOR AUTOMOBILE AND AUTOMOBILE INCLUDING THE SAME

(71) Applicant: HYUNDAI MOBIS CO., LTD., Seoul (KR)

(72) Inventor: Hyun Soo Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/077,617

(22) Filed: Oct. 22, 2020

(65) Prior Publication Data

US 2021/0381673 A1 Dec. 9, 2021

(30) Foreign Application Priority Data

Jun. 9, 2020 (KR) .......................... 10-2020-0069653

(51) Int. Cl.
*F21V 5/00* (2018.01)
*F21S 41/20* (2018.01)
(Continued)

(52) U.S. Cl.
CPC .............. *F21V 5/004* (2013.01); *F21S 41/20* (2018.01); *F21S 41/265* (2018.01); *F21S 41/27* (2018.01);
(Continued)

(58) Field of Classification Search
CPC .. G02B 3/0043; G02B 3/0056; G02B 3/0062; G02B 3/0068; F21V 5/002; F21V 5/004;
(Continued)

(56) References Cited

U.S. PATENT DOCUMENTS

| 6,124,975 A * | 9/2000 | Dona | B44F 1/06 |
| | | | 359/619 |
| 6,363,603 B1 * | 4/2002 | Nemoto | B29C 43/021 |
| | | | 29/458 |

(Continued)

FOREIGN PATENT DOCUMENTS

| JP | 2003-100118 A | 4/2003 |
| JP | 2016-534503 A | 11/2016 |

(Continued)

OTHER PUBLICATIONS

"Office Action Issued in Korean Patent Application No. 10-2020-0069653", dated Sep. 17, 2021.

(Continued)

*Primary Examiner* — Colin J Cattanach
(74) *Attorney, Agent, or Firm* — NovoTechIP International PLLC

(57) ABSTRACT

Disclosed are a lamp for an automobile and an automobile. The lamp for an automobile includes a micro lens array (MLA) module which is provided in front of a light source and into which light is incident. The MLA module includes a light-incident lens array and a light-emitting lens array. At least a portion of optical axes of a plurality of light-incident lenses provided in a first section of the light-incident lens array is aligned with one of optical axes of a plurality of light-emitting lenses provided in an A section of the light-emitting lens array. At least a portion of optical axes of a plurality of light-incident lenses provided in a second section of the light-incident lens array is misaligned with all of the optical axes of a plurality of light-emitting lenses provided in a B section of the light-emitting lens array.

13 Claims, 8 Drawing Sheets

(51) Int. Cl.
  *F21W 102/13*     (2018.01)
  *G02B 3/00*       (2006.01)
  *F21S 41/27*      (2018.01)
  *F21S 41/265*     (2018.01)

(52) U.S. Cl.
  CPC ............ *F21S 41/285* (2018.01); *F21V 5/002* (2013.01); *F21V 5/005* (2013.01); *F21V 5/008* (2013.01); *F21W 2102/13* (2018.01); *G02B 3/0043* (2013.01); *G02B 3/0056* (2013.01); *G02B 3/0062* (2013.01); *G02B 3/0068* (2013.01)

(58) Field of Classification Search
  CPC ........ F21V 5/005; F21V 5/008; F21S 41/265; F21S 41/27; F21S 41/285; F21S 41/20
  See application file for complete search history.

(56) References Cited

U.S. PATENT DOCUMENTS

| | | | | |
|---|---|---|---|---|
| 6,381,071 | B1* | 4/2002 | Dona | ................ G02B 30/27 359/621 |
| 7,839,573 | B2 | 11/2010 | Wippermann et al. | |
| 10,591,126 | B2 | 3/2020 | Mandl | |
| 10,746,369 | B2* | 8/2020 | Gehb | ................ F21S 41/255 |
| 10,962,191 | B1* | 3/2021 | Go | ................ F21S 41/32 |
| 2013/0021672 | A1* | 1/2013 | Yamamura | ....... B29D 11/00298 359/619 |
| 2016/0238214 | A1* | 8/2016 | Hashimoto | .......... G02B 3/0043 |
| 2016/0265733 | A1* | 9/2016 | Bauer | ................ F21S 41/20 |
| 2018/0320852 | A1* | 11/2018 | Mandl | ................ F21S 41/322 |
| 2018/0335191 | A1* | 11/2018 | Stefanov | ................ F21S 41/635 |
| 2019/0186706 | A1* | 6/2019 | Kim | ................ F21S 41/40 |
| 2020/0080704 | A1* | 3/2020 | Kim | ................ F21S 41/265 |
| 2020/0141553 | A1* | 5/2020 | Han | ................ F21S 41/43 |
| 2020/0386382 | A1* | 12/2020 | Choi | ................ F21S 41/265 |
| 2021/0003746 | A1* | 1/2021 | Shibuya | ............... G02B 3/0056 |
| 2021/0033752 | A1* | 2/2021 | Lin | ................ G02B 7/09 |

FOREIGN PATENT DOCUMENTS

| | | |
|---|---|---|
| JP | 2020-052343 A | 4/2020 |
| JP | 2020061231 A | 4/2020 |
| KR | 10-2018-0111027 A | 10/2018 |
| KR | 20190071287 A | 6/2019 |
| KR | 10-2019-0078814 A | 7/2019 |
| KR | 10-2019-0081309 A | 7/2019 |
| KR | 10-2036749 B1 | 10/2019 |

OTHER PUBLICATIONS

Notice of Allowance issued in corresponding Korean application No. 10-2020-0069653 dated Mar. 30, 2022.

* cited by examiner

LAMP FOR AUTOMOBILE AND AUTOMOBILE INCLUDING THE SAME

CROSS-REFERENCE TO RELATED APPLICATION(S)

This application claims priority from and the benefit of Korean Patent Application No. 10-2020-0069653, filed on Jun. 9, 2020, which is hereby incorporated by reference for all purposes as if set forth herein.

TECHNICAL FIELD

Exemplary embodiments relate to a lamp for an automobile and an automobile including the lamp and, more specifically, to a lamp, which is for an automobile and utilizes a micro lens array, and an automobile including the lamp.

BACKGROUND

Micro lens arrays including a plurality of micro lenses are widely used in a field of micro optics such as optical communication, direct optical imaging, and the like. Particularly, a recent micro lens array has a feature capable of drawing a specific pattern on a road surface through an optical system having a size of about 10 mm, and thus has been used as a component performing a welcome light function in an automobile.

However, in the micro lens array according to the related art, a diffusion angle of light is as small as about 15 degrees, and thus, other lighting functions (for example, a low beam function) other than the welcome light function may not be performed in an automobile. Therefore, there is a limitation in using the micro lens array in an automobile.

SUMMARY

Exemplary embodiments of the present disclosure is to enlarge a divergence angle of light emitted from a micro lens array to replace a lamp for an automobile of the related art with the micro lens array.

A first exemplary embodiment of the present disclosure provides a lamp for an automobile, the lamp including: a light source configured to generate and emit light; and a micro lens array (MLA) module which is provided in front of the light source and into which the light is incident, wherein the MLA module includes: a light-incident lens array to which the light is incident, and which includes a plurality of light-incident lenses; and a light-emitting lens array which is provided in front of the light-incident lens array, receives the light incident into the light-incident lens array to emit the light to the outside, and includes a plurality of light-emitting lenses, wherein the light-incident lens array includes a first section and a second section, and the light-emitting lens array includes an A section and a B section, wherein the light incident into the first section is emitted from the first section and incident into the A section, and the light incident into the second section is emitted from the second section and incident into the B section, wherein at least a portion of optical axes of the plurality of light-incident lenses provided in the first section is aligned with one of optical axes of the plurality of light-emitting lenses provided in the A section, and at least a portion of optical axes of the plurality of light-incident lenses provided in the second section is misaligned with all of the optical axes of the plurality of light-emitting lenses provided in the B section.

All of the optical axes of the plurality of light-incident lenses provided in the first section may be aligned with the optical axes of the plurality of light-emitting lenses provided in the A section, respectively, and all of the optical axes of the plurality of light-incident lenses provided in the second section may be misaligned with all of the optical axes of the plurality of light-emitting lenses provided in the B section, respectively.

The first section may be provided on a central area of the light-incident lens array in a horizontal direction, and the second section may be provided on each of a left area and a right area of the first section.

The A section may be provided on a central area of the light-emitting lens array in a horizontal direction, and the B section may be provided on each of a left area and a right area of the A section.

In each of the plurality of light-incident lenses provided in the light-incident lens array, a radius of curvature in a horizontal direction may be different from a radius of curvature in a vertical direction.

All of the optical axes of the plurality of light-incident lenses provided in the second section may be misaligned horizontally with all of the optical axes of the plurality of light-emitting lenses provided in the B section, respectively.

All of the optical axes of the plurality of light-incident lenses provided in the light-incident lens array may be vertically disposed at the same height as the optical axes of the plurality of light-emitting lenses provided in the light-emitting lens array, respectively.

A width of each of the plurality of light-emitting lenses in a horizontal direction, which are provided in the B section, may be less than a width of each of the plurality of light-emitting lenses in the horizontal direction, which are provided in the A section.

Widths of the plurality of light-incident lenses in a vertical direction, which are provided in the light-incident lens array, may be the same as each other.

Widths of the plurality of light-emitting lenses in a vertical direction, which are provided in the light-emitting lens array, may be the same as each other.

In each of the plurality of light-emitting lenses provided in the light-emitting lens array, a radius of curvature in a horizontal direction may be the same as a radius of curvature in a vertical direction.

The MLA module may further include a shield provided between the light-incident lens array and the light-emitting lens array, and the shield may be provided at a position corresponding to focuses of the plurality of light-emitting lenses provided in the light-emitting lens array.

A radius of curvature of each of the plurality of light-emitting lenses provided in the A section may be the same as a radius of curvature of each of the plurality of light-emitting lenses provided in the B section.

A width of each of the plurality of light-incident lenses in a horizontal direction, which are provided in the first section, may be the same as a width of each of the plurality of light-incident lenses in the horizontal direction, which are provided in the second section.

A radius of curvature of each of the plurality of light-incident lenses in the horizontal direction, which are provided in the first section, may be different from a radius of curvature of each of the plurality of light-incident lenses in the horizontal direction, which are provided in the second section.

A second exemplary embodiment of the present disclosure provides an automobile including a lamp for an automobile, wherein the lamp includes: a light source configured to generate and emit light; and a micro lens array (MLA) module which is provided in front of the light source and into which the light is incident, wherein the MLA module includes: a light-incident lens array to which the light is incident, and which includes a plurality of light-incident lenses; and a light-emitting lens array which is provided in front of the light-incident lens array, receives the light incident into the light-incident lens array to emit the light to the outside, and includes a plurality of light-emitting lenses, wherein the light-incident lens array includes a first section and a second section, and the light-emitting lens array includes an A section and a B section, wherein the light incident into the first section is emitted from the first section and incident into the A section, and the light incident into the second section is emitted from the second section and incident into the B section, wherein at least a portion of optical axes of the plurality of light-incident lenses provided in the first section is aligned with one of optical axes of the plurality of light-emitting lenses provided in the A section, and at least a portion of optical axes of the plurality of light-incident lenses provided in the second section is misaligned with all of the optical axes of the plurality of light-emitting lenses provided in the B section.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION

Hereinafter, a lamp for an automobile, and an automobile according to the present disclosure will be described with reference to the drawings.

Lamp for Automobile

Figure 1:
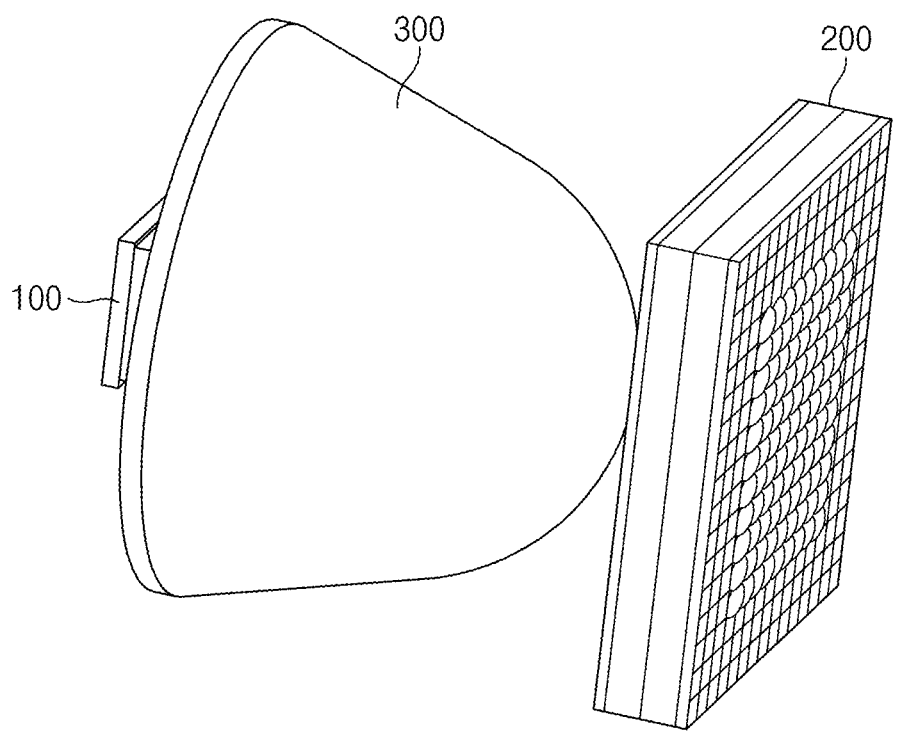
FIG. 1 is a perspective view illustrating a structure of a lamp for an automobile according to the present disclosure.
Figure 2:
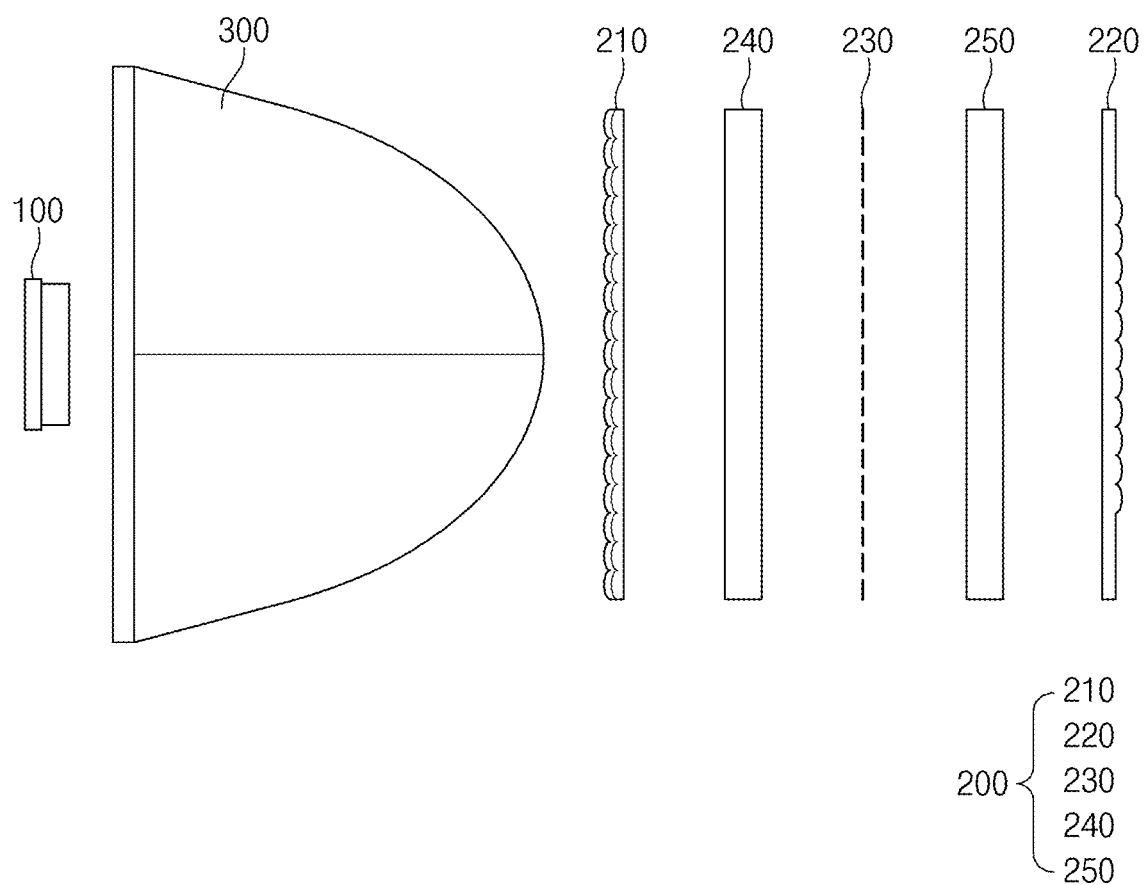
FIG. 2 is a side cross-sectional view illustrating a structure of a lamp for an automobile when an MLA module is disassembled.

FIG. 1 is a perspective view illustrating a structure of a lamp for an automobile according to the present disclosure, and FIG. 2 is a side cross-sectional view illustrating a structure of a lamp for an automobile when an MLA module is disassembled. Also, FIG. 3 is an enlarged front view illustrating a structure of a light-incident lens array of a lamp for an automobile according to the present disclosure, and FIG. 4 is an enlarged front view illustrating a structure of a light-emitting lens array of a lamp for an automobile according to the present disclosure.

As illustrated in FIGS. 1 and 2, a lamp 10 for an automobile (hereinafter, referred to as a 'lamp') according to the present disclosure includes: a light source 100 that generates and emits light; and a micro lens array (MLA) module 200 which is provided in front of the light source 100 and into which the light is incident from the light source 100, the MLA module 200 including a plurality of micro lenses. The light source 100 may be a light-emitting diode (LED), but is not limited thereto.

Also, the lamp 10 may further include a collimator 300 provided between the light source 100 and the MLA module 200. The collimator 300 may be configured to make light, incident from the light source 100, parallel light and then emit the parallel light to the MLA module 200.

Figure 3:
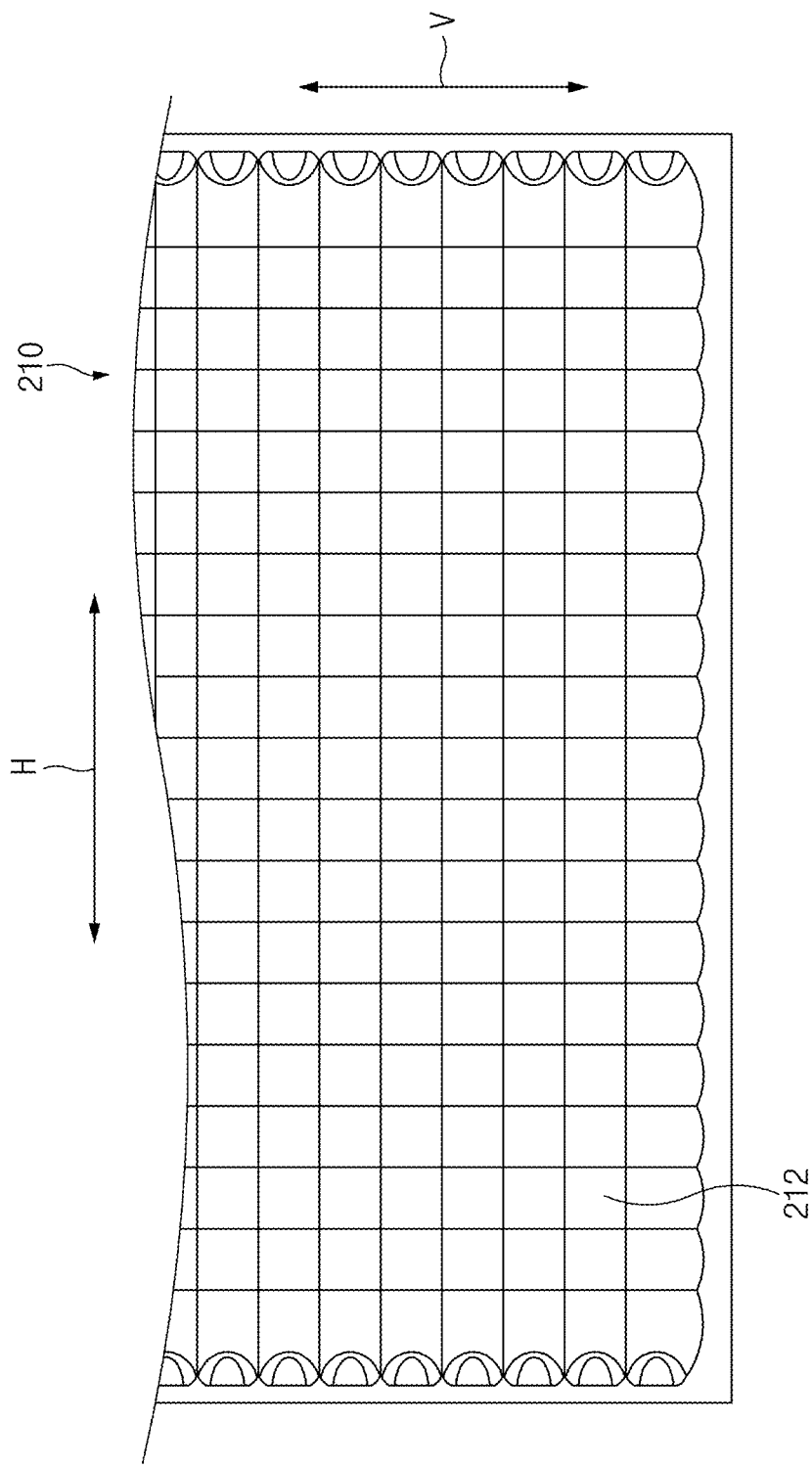
FIG. 3 is an enlarged front view illustrating a structure of a light-incident lens array of a lamp for an automobile according to the present disclosure.
Figure 4:
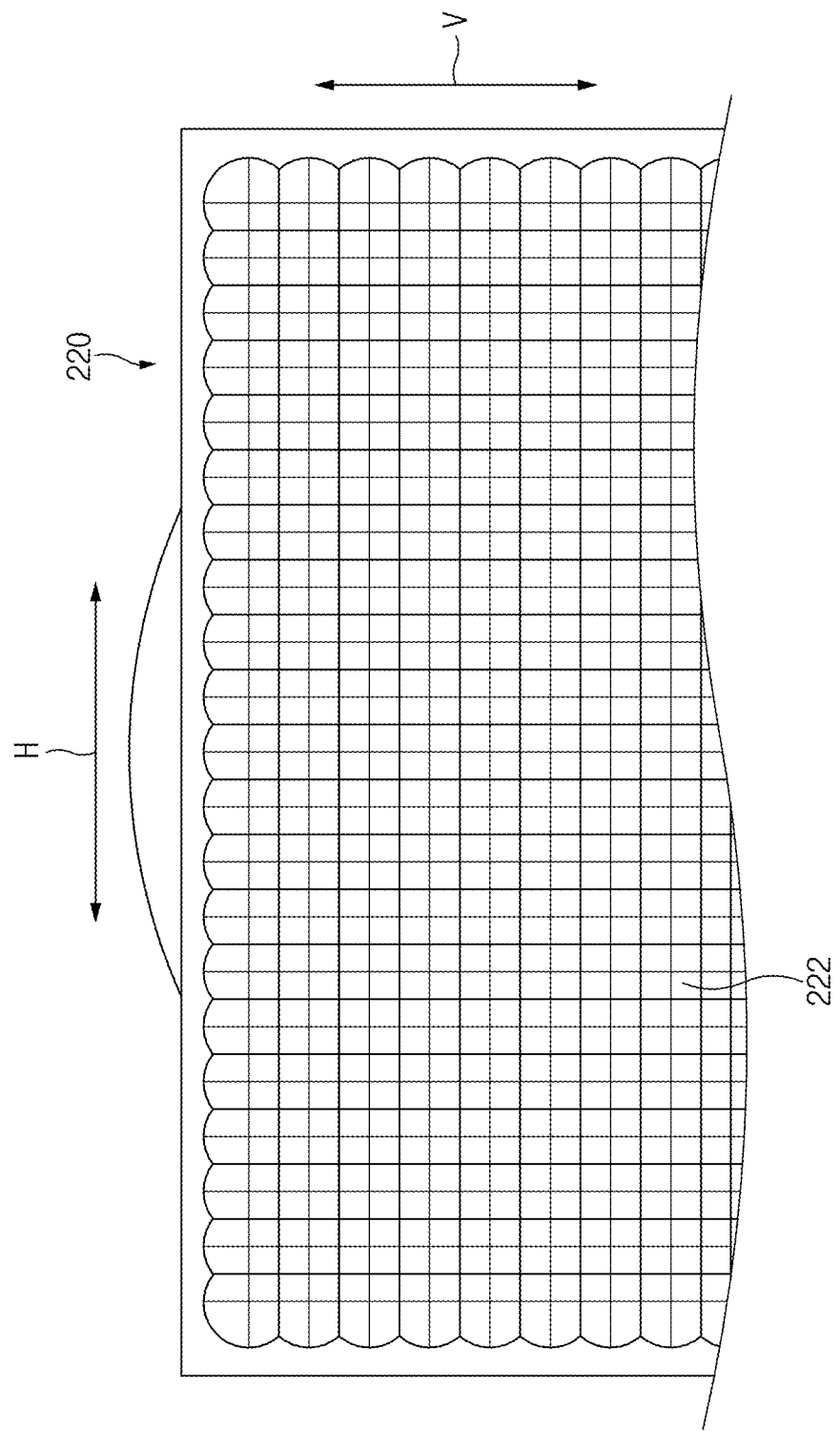
FIG. 4 is an enlarged front view illustrating a structure of a light-emitting lens array of a lamp for an automobile according to the present disclosure.

Continuing to refer to FIGS. 2 to 4, the MLA module 200 may include a light-incident lens array 210 which is provided to face the collimator 300 and into which the light from the light source 100 is incident. As illustrated in FIG. 3, the light-incident lens array 210 may include a plurality of light-incident lenses 212. Here, as illustrated in FIGS. 2 and 3, the plurality of light-incident lenses 212 may be convex lenses that protrude toward the light source 100.

More specifically, in each of the plurality of light-incident lenses 212 provided in the light-incident lens array 210, a radius of curvature in a horizontal direction H may be different from a radius of curvature in a vertical direction V. For example, in each of the plurality of light-incident lenses, the radius of curvature in the horizontal direction H may be less than the radius of curvature in the vertical direction V (that is, the curvature in the horizontal direction may be greater than the curvature in the vertical direction). In this case, the light, which has been emitted from the light source 100 and incident into the light-incident lens array 210, may diffuse in the horizontal direction while passing through the plurality of light-incident lenses 212, and thus, compared to a micro lens array of the related art, the diffusion of light (particularly, the diffusion of light in the horizontal direction) may occur significantly.

Also, the MLA module 200 may include a light-emitting lens array 220 which is provided in front of the light-incident lens array 210, receives the light incident into the light-incident lens array 210, and emits the light to the outside. As illustrated in FIG. 4, the light-emitting lens array 220 may include a plurality of light-emitting lenses 222. Here, as illustrated in FIGS. 2 and 4, the plurality of light-emitting lenses 222 may be convex lenses that protrude in the outward direction opposite to the light source 100. In each of the plurality of light-emitting lenses 222 provided in the light-emitting lens array 220 unlike the plurality of light-incident lenses 212 provided in the light-incident lens array 210, a radius of curvature in a horizontal direction H may be the same as a radius of curvature in a vertical direction V.

Here, as illustrated in FIGS. 1 and 2, the MLA module 200 may include a shield 230 provided between the light-incident lens array 210 and the light-emitting lens array 220. The shield 230 may have a plurality of slits through which the light emitted from the light-incident lens array 210 may be incident into the light-emitting lens array 220.

Here, in the lamp 10 according to the present disclosure, the shield 230 may be provided at a position corresponding to focuses of the light-emitting lenses 222 provided in the light-emitting lens array 220. In this case, considering characteristics of the lens, the light, which reaches the light-emitting lens array 220 after passing through the slits of the shield 230 from the light-incident lens array 210, may be emitted to the outside in the vertical direction and in the form of light parallel to the ground.

Here, the fact that the shield 230 is provided at the position corresponding to the focuses of the light-emitting lenses 222 may be interpreted as having not only a case in which the shield 230 and the focuses of the light-emitting lenses 222 overlap with each other but also a case in which the above-described two components are disposed so close to each other. In the latter case, there is no substantial difference in functions and effects when compared to the above case, in which the two components overlap with each other, by one of ordinary skill in the art to which this disclosure belongs. However, more preferably, the focuses of the light-emitting lenses 222 may be provided inside a body of the shield 230.

Here, the MLA module 200 may further include: a light-incident body part 240 that is provided between the light-incident lens array 210 and the shield 230 and supports the light-incident lens array 210; and a light-emitting body part 250 that is provided between the light-emitting lens array 220 and the shield 230 and supports the light-emitting lens array 220. However, unlike the above structure, the MLA module 200 may not include the light-incident body part 240 or the light-emitting body part 250.

Here, the lamp 10 according to the present disclosure may have a structure for providing a low beam pattern of an automobile.

Figure 5:
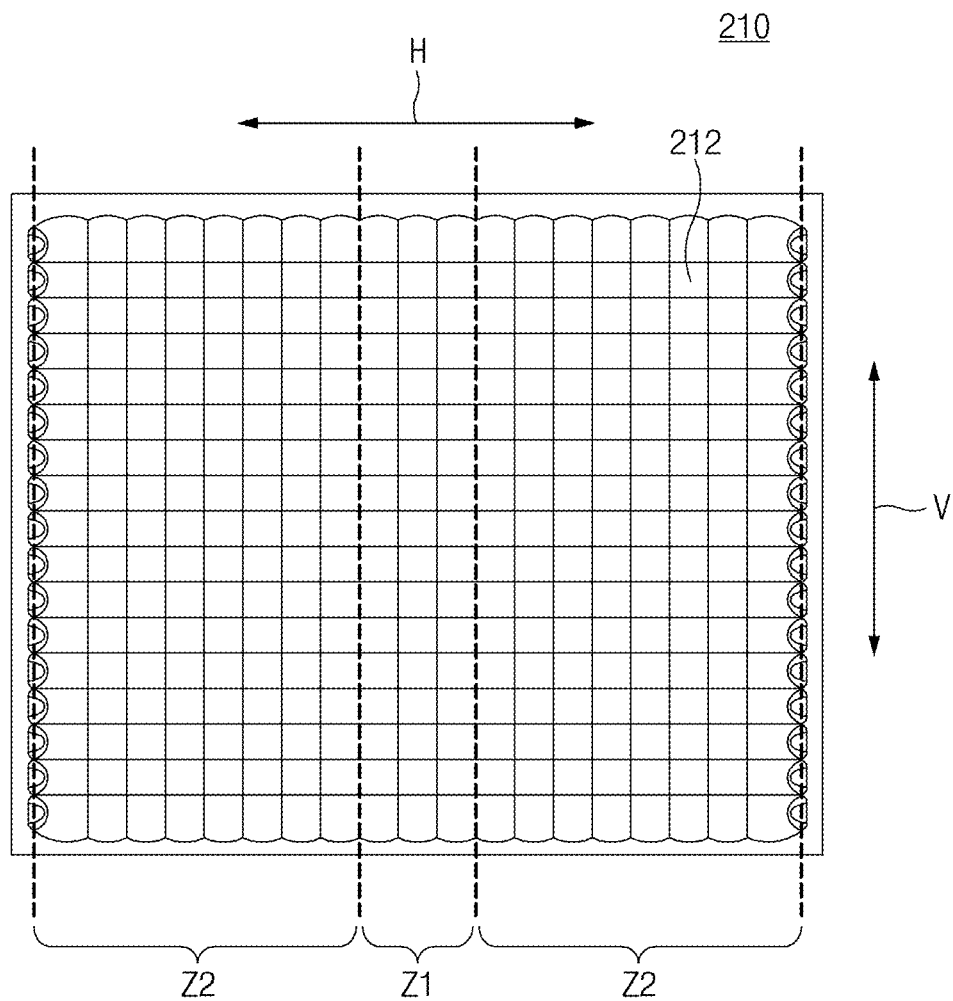
FIG. 5 is a front view illustrating a state in which a light-incident lens array of a lamp for an automobile according to the present disclosure is divided into a plurality of sections.
Figure 6:
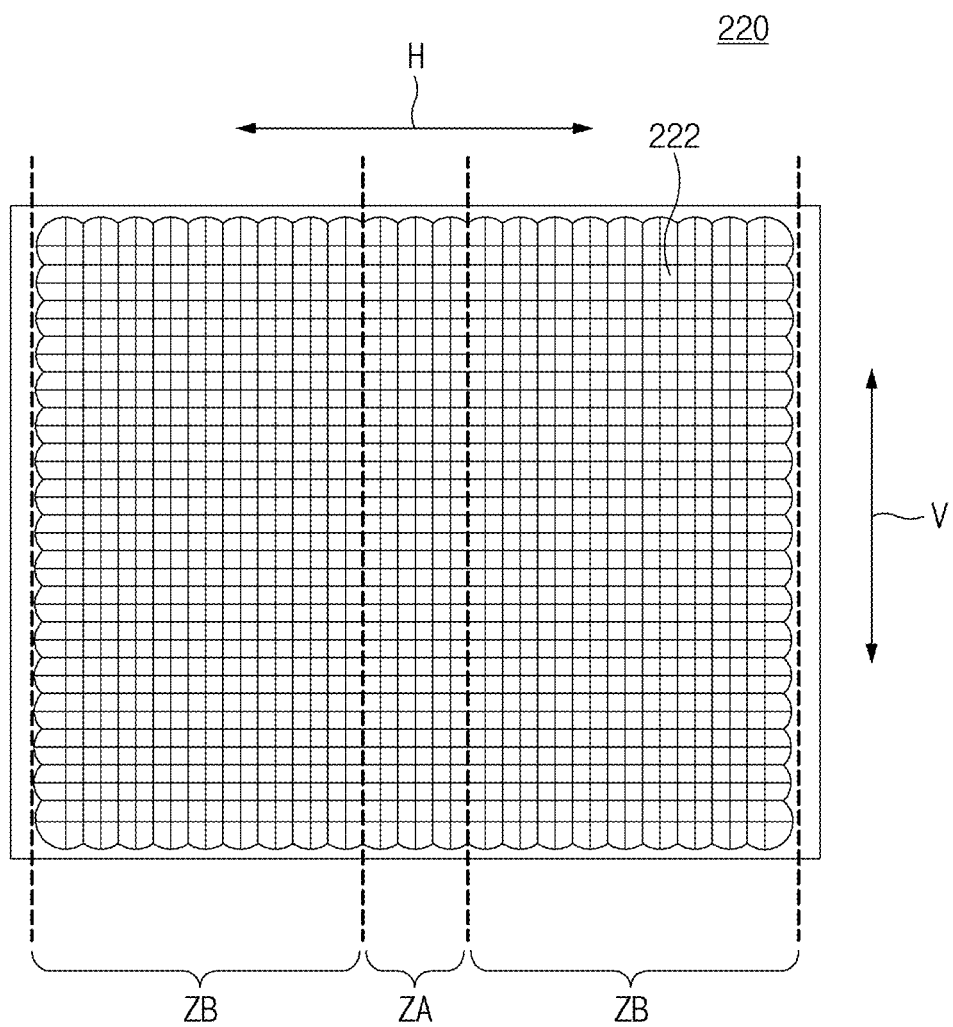
FIG. 6 is a front view illustrating a state in which a light-emitting lens array of a lamp for an automobile according to the present disclosure is divided into a plurality of sections.

FIG. 5 is a front view illustrating a state in which a light-incident lens array of a lamp for an automobile according to the present disclosure is divided into a plurality of sections, and FIG. 6 is a front view illustrating a state in which a light-emitting lens array of a lamp for an automobile according to the present disclosure is divided into a plurality of sections.

Here, in the lamp according to the present disclosure, the light-incident lens array 210 and the light-emitting lens array 220 may be divided into a plurality of sections according to characteristics of the light-incident lenses and the light-emitting lenses, respectively.

That is, referring to FIG. 5, the light-incident lens array 210 may be divided into a first section Z1 and a second section Z2 according to characteristics of the light-incident lenses 212 provided in the light-incident lens array 210. Also, referring to FIG. 6, the light-emitting lens array 220 may be divided into an A section ZA and a B section ZB according to characteristics of the light-emitting lenses 222 provided in the light-emitting lens array 220.

Here, the first section Z1 may be provided on a central area of the light-incident lens array 210 in a horizontal direction H, and the second section Z2 may be provided on each of a left area and a right area of the first section Z1.

Here, FIG. 5 illustrates a case where the first section Z1 and the second section Z2 are in contact with each other, but unlike the above case, the first section Z1 and the second section Z2 may be spaced apart from each other. For example, a third section including a plurality of light-incident lenses may be provided between the first section Z1 and the second section Z2.

Also, the A section ZA may be provided on a central area of the light-emitting lens array 220 in a horizontal direction H, and the B section ZB may be provided on each of a left area and a right area of the light-emitting lens array 220.

Here, FIG. 6 illustrates a case where the A section ZA and the B section ZB are in contact with each other, but unlike the above case, the A section ZA and the B section ZB may be spaced apart from each other. For example, a C section including a plurality of light-emitting lenses may be provided between the A section ZA and the B section ZB.

Here, the first section Z1 and the A section ZA may face each other with the shield 230, the light-incident body part 240, and the light-emitting body part 250 therebetween, and the second section Z2 and the B section ZB may face each other with the shield 230, the light-incident body part 240, and the light-emitting body part 250 therebetween. More preferably, the first section Z1 and the A section ZA may have the same width in the horizontal direction H, and the second section Z2 and the B section ZB may also have the same width in the horizontal direction H.

Thus, the light, which has been emitted from the light source 100 and incident into the first section Z1 of the light-incident lens array 210, may be emitted from the first section Z1 and then incident into the A section ZA of the light-emitting lens array 220. Also, the light, which has been emitted from the light source 100 and incident into the second section Z2 of the light-incident lens array 210, may be emitted from the second section Z2 and then incident into the B section ZB of the light-emitting lens array 220.

More preferably, the light, which is emitted to the outside after passing through the first section Z1 and the A section ZA, may provide a central region of a beam pattern formed outside by the lamp 10 according to the present disclosure, and the light, which is emitted to the outside after passing through the second section Z2 and the B section ZB, may provide a peripheral region of the beam pattern formed outside by the lamp 10 according to the present disclosure.

Figure 7:
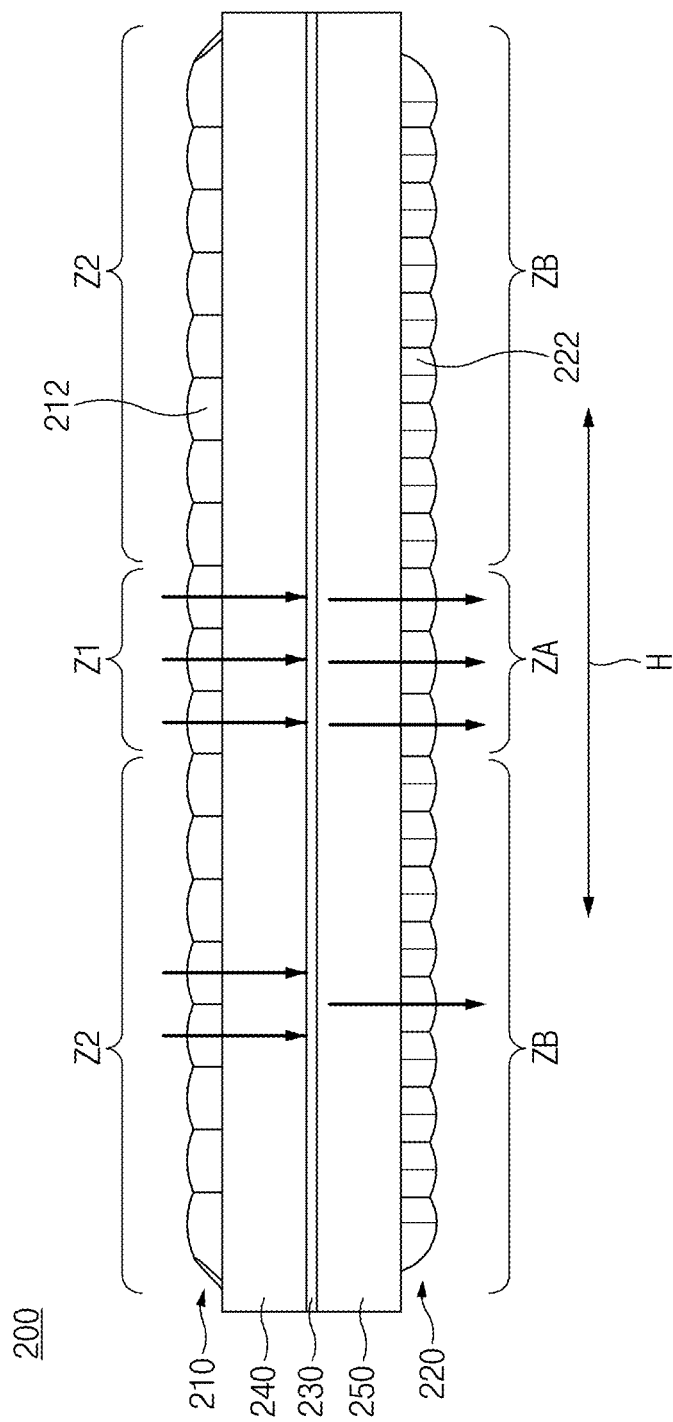
FIG. 7 is a cross-sectional view illustrating a horizontal cross-section of an MLA module of a lamp for an automobile according to the present disclosure.
Figure 8:
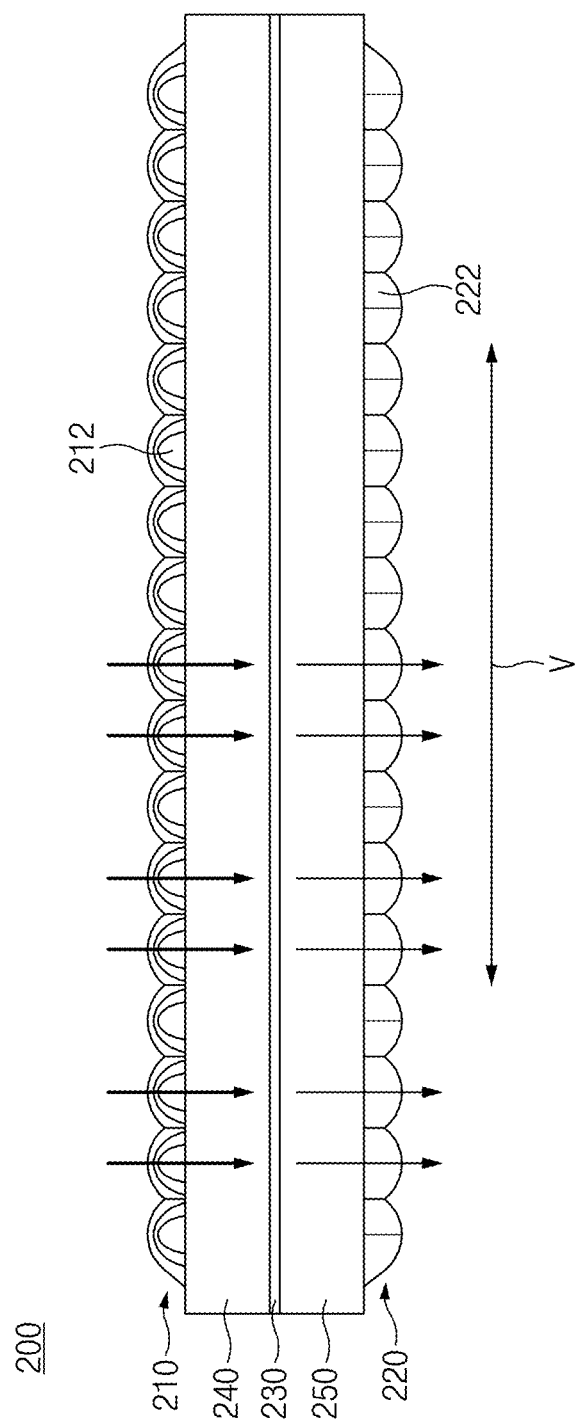
FIG. 8 is a cross-sectional view illustrating a vertical cross-section of an MLA module of a lamp for an automobile according to the present disclosure.

FIG. 7 is a cross-sectional view illustrating a horizontal cross-section of an MLA module of a lamp for an automobile according to the present disclosure, and FIG. 8 is a cross-sectional view illustrating a vertical cross-section of an MLA module of a lamp for an automobile according to the present disclosure.

As described above, the MLA module may include the light-incident lens array 210 and the light-emitting lens array 220, and the light-incident lens array 210 and the light-emitting lens array 220 may include the plurality of light-incident lenses and the plurality of light-emitting lenses, respectively. Also, each of the plurality of light-incident lenses and the plurality of light-emitting lenses may have an optical axis. In FIGS. 7 and 8, a portion of optical axes defined in the plurality of light-incident lenses 212 and the plurality of light-emitting lenses 222 are illustrated by arrows pointing downward.

According to the present disclosure, at least a portion of the optical axes of the plurality of light-incident lenses 212 provided in the first section Z1 of the light-incident lens array 210 may be aligned with one of the optical axes of the plurality of light-emitting lenses 222 provided in the A section ZA of the light-emitting lens array 220. On the other hand, according to the present disclosure, at least a portion of the optical axes of the plurality of light-incident lenses 212 provided in the second section Z2 of the light-incident lens array 210 may be misaligned with all of the optical axes of the plurality of light-emitting lenses 222 provided in the B section ZB of the light-emitting lens array 220.

More preferably, according to the present disclosure, all of the optical axes of the plurality of light-incident lenses 212 provided in the first section Z1 may be aligned with the optical axes of the plurality of light-emitting lenses 222 provided in the A section ZA, respectively, and all of the optical axes of the plurality of light-incident lenses 212 provided in the second section Z2 may be misaligned with all of the optical axes of the plurality of light-emitting lenses 222 provided in the B section ZB, respectively. For example, as illustrated in FIG. 7, all of the optical axes of the plurality of light-incident lenses 212 provided in the second section Z2 may be misaligned, in the horizontal direction H, with all of the optical axes of the plurality of light-emitting lenses 222 provided in the B section ZB, respectively.

A beam pattern formed outside by the lamp may be divided into a central region and a peripheral region. Particularly, in a case in which the lamp is configured to provide a low beam pattern of an automobile, the central region of the beam pattern is required to have a high luminous intensity, and the peripheral region of the beam pattern has a low luminous intensity but is required to horizontally cover a wide range.

Thus, according to the present disclosure, because the optical axes of the first section and the A section, which are provided on the central areas of the light-incident lens array and the light-emitting lens array, respectively, in the horizontal direction H, are aligned with each other, the light may reach the outside while not diffused in the horizontal direction H. Thus, the high luminous intensity may be secured in the central region of the beam pattern formed by the lamp according to the present disclosure.

On the other hand, according to the present disclosure, because the optical axes of the second section and the B section, which are provided on each of the left and right areas of the light-incident lens array and the light-emitting lens array, respectively, in the horizontal direction, are misaligned with each other in the horizontal direction, the light may be diffused in the horizontal direction while the light, which has been emitted from the second section and incident into the B section, is emitted. Thus, the horizontal peripheral region of the beam pattern formed by the lamp according to the present disclosure has the low luminous intensity, but may cover the wide range in the horizontal direction.

Particularly, the micro lens array of the related art may not be used in a head lamp (for example, a lamp for a low beam) of an automobile because a width of the beam pattern in the horizontal direction is small, but on the other hand, the lamp including the MLA module according to the present disclosure may be used as the head lamp of an automobile because a width of the beam pattern in the horizontal direction formed by the lamp is large.

Here, according to the present disclosure, a portion of the optical axes of the plurality of light-incident lenses 212 provided in the light-incident lens array 210 may be disposed at the same height in a vertical direction V as one of the optical axes of the plurality of light-emitting lenses 222 provided in the light-emitting lens array 220. More preferably, as illustrated in FIG. 8, all of the optical axes of the plurality of light-incident lenses 212 may be disposed at the same height, in the vertical direction V, as the optical axes of the plurality of light-emitting lenses 222, respectively.

As described above, in the beam pattern formed by the lamp according to the present disclosure, the width in the horizontal direction may be large. On the other hand, the width of the beam pattern in the vertical direction may be relatively small. Particularly, the lamp according to the present disclosure may be a lamp for a low beam, and in this case, the width of the low beam pattern in the vertical direction may be required to be relatively small.

Thus, in a case where the optical axes of the plurality of light-incident lenses 212 and the optical axes of the plurality of light-emitting lenses 222 have the same heights, respectively, in the vertical direction as described above, the light, which is emitted to the outside after passing through the light-incident lens array and the light-emitting lens array, is less diffused in the vertical direction, and thus, the width of the beam pattern in the vertical direction may also be small.

Here, referring to FIGS. 4, 6, and 7, the width of each of the plurality of light-emitting lenses 222 in the horizontal direction H, which are provided in the B section ZB of the light-emitting lens array 220, may be less than the width of each of the plurality of light-emitting lenses 222 in the horizontal direction H, which are provided in the A section ZA of the light-emitting lens array 220. For example, the width of each of the plurality of light-emitting lenses 222 in the horizontal direction H, which are provided in the B section ZB, may be less by about 10% than the width of each of the plurality of light-emitting lenses 222 in the horizontal direction H, which are provided in the A section ZA. On the other hand, referring to FIGS. 3, 5, and 7, the width of each of the plurality of light-incident lenses 212 in the horizontal direction H, which are provided in the first section Z1 of the light-incident lens array 210, may be the same as the width of each of the plurality of light-incident lens 212 in the horizontal direction H, which are provided in the second section Z2 of the light-incident lens array 210. Also, the width of each of the plurality of light-incident lenses 212 in the horizontal direction H, which are provided in the first section Z1, may be the same as the width of each of the plurality of light-emitting lenses 222 in the horizontal direction H, which are provided in the A section ZA.

As described above, this may be to ensure that all of the optical axes of the plurality of light-incident lenses 212 provided in the second section Z2 are misaligned, in the horizontal direction H, with all of the optical axes of the plurality of light-emitting lenses 222 provided in the B section ZB, respectively. That is, according to the present disclosure, the widths of the light-incident lenses and the light-emitting lenses in the horizontal direction H, which are provided in the first section Z1 and the A section ZA, respectively, are made to be the same as each other, and thus, the optical axes of the light-incident lenses and the optical axes of the light-emitting lenses, which are provided in the first section Z1 and the A section ZA, respectively, are aligned with each other. On the other hand, the widths of the light-incident lenses and the light-emitting lenses in the horizontal direction H, which are provided in the second section Z2 and the B section ZB, respectively, are made to be different from each other, and thus, the optical axes of the light-incident lenses and the optical axes of the light-emitting lenses, which are provided in the second section Z2 and the B section ZB, respectively, may be misaligned with each other.

Continuing to refer to the drawings, the widths of the plurality of light-incident lenses 212 in the vertical direction V, which are provided in the light-incident lens array 210, may be the same as each other. Also, the widths of the plurality of light-emitting lenses 222 in the vertical direction V, which are provided in the light-emitting lens array 220, may also be the same as each other. Here, the width of the light-incident lens 212 in the vertical direction V may be the same as the width of the light-emitting lens 222 in the vertical direction V. As described above, this may be to ensure that all of the optical axes of the plurality of light-incident lenses 212 are disposed at the same height in the vertical direction V as the optical axes of the plurality of light-emitting lenses 222, respectively.

Here, according to the present disclosure, the radius of curvature of each of the plurality of light-incident lenses 212 in the horizontal direction H, which are provided in the first section Z1, may be different from the radius of curvature of each of the plurality of light-incident lenses 212 in the horizontal direction H, which are provided in the second section Z2. In one example, the radius of curvature of each of the plurality of light-incident lenses 212 in the horizontal direction H, which are provided in the first section Z1, may be greater than the radius of curvature of each of the plurality of light-incident lenses 212 in the horizontal direction H, which are provided in the second section Z2. That is, the curvature of each of the plurality of light-incident lenses 212 in the horizontal direction H, which are provided in the second section Z2, may be greater than the curvature of each of the plurality of light-incident lenses 212 in the horizontal direction H, which are provided in the first section Z1. This may be to ensure that the horizontal width of the peripheral region of the beam pattern formed by the lamp according to the present disclosure is large.

On the other hand, according to the present disclosure, the radius of curvature of each of the plurality of light-emitting lenses 222 provided in the A section ZA may be the same as the radius of curvature of each of the plurality of light-emitting lenses 222 provided in the B section ZB.

Automobile

An automobile according to the present invention may include a lamp 10 for an automobile (hereinafter, referred to as a 'lamp').

Here, the lamp 10 may include: a light source 100 that generates and emits light; a micro lens array (MLA) module 200 which is provided in front of the light source 100 and into which the light is incident; and a collimator 300 provided between the light source 100 and the MLA module 200.

Also, the MLA module 200 may include: a light-incident lens array 210 to which the light is incident, and which includes a plurality of light-incident lenses 212; a light-emitting lens array 220 which is provided in front of the light-incident lens array 210, receives the light incident into the light-incident lens array 210 to emit the light to the outside, and includes a plurality of light-emitting lenses 222; a shield 230 provided between the light-incident lens array 210 and the light-emitting lens array 220; a light-incident body part 240 that is provided between the light-incident lens array 210 and the shield 230 and supports the light-incident lens array 210; and a light-emitting body part 250 that is provided between the light-emitting lens array 220 and the shield 230 and supports the light-emitting lens array 220.

Here, the light-incident lens array 210 may include a first section Z1 and a second section Z2, and the light-emitting lens array 220 may include an A section ZA and a B section ZB. Also, the light, which has been incident into the first section Z1, may be emitted from the first section Z1 and then incident into the A section ZA, and the light, which has been incident into the second section Z2, may be emitted from the second section Z2 and then incident into the B section ZB.

Here, according to the present disclosure, at least a portion of optical axes of the plurality of light-incident lenses 212 provided in the first section Z1 may be aligned with one of optical axes of the plurality of light-emitting lenses 222 provided in the A section ZA. Also, at least a portion of the optical axes of the plurality of light-incident lenses 212 provided in the second section Z2 may be misaligned with all of the optical axes of the plurality of light-emitting lenses 222 provided in the B section ZB.

According to the present disclosure, the divergence angle of the light emitted from the micro lens array is enlarged, and thus, the lamp for an automobile of the related art may be replaced with the micro lens array.

Although the present disclosure is described by specific embodiments and drawings as described above, the present disclosure is not limited thereto, and it is obvious that various changes and modifications may be made by a person skilled in the art to which the present disclosure pertains within the technical idea of the present disclosure and equivalent scope of the appended claims.

What is claimed is:

1. A lamp for an automobile, comprising:
a light source configured to generate and emit light; and
a micro lens array (MLA) module arranged in front of the light source and comprising:
   a light-incident lens array comprising a plurality of light-incident lenses and divided into first and second sections, the first section arranged at a horizontal center of the light-incident lens array and longitudinally extending continuously from a top to a bottom of the light-incident lens array; and
   a light-emitting lens array arranged in front of the light-incident lens array, comprising a plurality of light-emitting lenses and divided into A and B sections, the A section arranged at a horizontal center of the light-emitting lens array and longitudinally extending continuously from a top to a bottom of the light-emitting lens array,
wherein the first and second sections of the light-incident lens array are configured to direct the light emitted from the light source to the A and B sections of the light-emitting lens array, respectively,
wherein the first section of the light-incident lens array comprises at least one light-incident lens having an optical axis aligned with that of one of the light-emitting lenses in the A section of the light-emitting lens array, and the second section of the light-incident lens array comprises at least one light-incident lens having an optical axis that does not align with an optical axis of any of the light-emitting lenses in the B section of the light-emitting lens array,
wherein, in the first section of the light-incident lens array, the entire light-incident lenses arranged on a common vertical column have a common horizontal width, and
wherein, in the light-incident lens array, each light-incident lens has a horizontal radius of curvature and a vertical radius of curvature that is different from the horizontal radius of curvature.

2. The lamp of claim 1, wherein:
the optical axes of the entire light-incident lenses in the first section of the light-incident lens array are aligned with those of an entire light-emitting lenses in the A section of the light-emitting lens array, respectively, and
the optical axes of the entire light-incident lenses in the second section of the light-incident lens array are misaligned with those of an entire light-emitting lenses in the B section of the light-emitting lens array.

3. The lamp of claim 1, wherein the second section of the light-incident lens array is located at left and right sides of the first section of the light-incident lens array.

4. The lamp of claim 1, wherein the B section of the light-emitting lens array is located at left and right sides of the A section of the light-emitting lens array.

5. An automobile comprising the lamp of claim 1.

6. The lamp of claim 1, wherein the optical axes of the entire light-incident lenses in the second section of the light-incident lens array are misaligned horizontally with those of an entire light-emitting lenses in the B section of the light-emitting lens array.

7. The lamp of claim 1, wherein the plurality of light-incident lenses in the light-incident lens array have a same vertical height as the plurality of light-emitting lenses in the light-emitting lens array.

8. The lamp of claim 1, wherein, in the light-emitting lens array, a horizontal width of the plurality of light-emitting lenses in the B section is less than that of the plurality of light-emitting lenses in the A section.

9. The lamp of claim 1, wherein, in the light-emitting lens array, the plurality of light-emitting lenses in the A and B sections have the same radius of curvature.

10. The lamp of claim 1, wherein, in the light-emitting lens array, the light-emitting lenses arranged on a same vertically row have a same horizontal width.

11. The lamp of claim 1, wherein, in the light-emitting lens array, the plurality of light-emitting lenses have same horizontal and vertical radii of curvature.

12. The lamp of claim 1, wherein the MLA module further comprises a shield arranged between the light-incident lens array and the light-emitting lens array, the shield comprising a plurality of slits positioned corresponding to a plurality of focuses of the plurality of light-emitting lenses in the light-emitting lens array, respectively.

13. A lamp for a vehicle, comprising:
- a light source configured to generate and emit light; and
- a micro lens array (MLA) module arranged in front of the light source and comprising:
    - a light-incident lens array comprising a plurality of light-incident lenses and divided into first and second sections, the first section arranged at a horizontal center of the light-incident lens array and longitudinally extending continuously from a top to a bottom of the light-incident lens array; and
    - a light-emitting lens array arranged in front of the light-incident lens array, comprising a plurality of light-emitting lenses and divided into A and B sections, the A section arranged at a horizontal center of the light-emitting lens array and longitudinally extending continuously from a top to a bottom of the light-emitting lens array, wherein the first and second sections of the light-incident lens array are configured to direct the light emitted from the light source to the A and B sections of the light-emitting lens array, respectively, wherein the first section of the light-incident lens array comprises at least one light-incident lens having an optical axis aligned with that of one of the light-emitting lenses in the A section of the light-emitting lens array, and the second section of the light-incident lens array comprises at least one light-incident lens having an optical axis that does not align with an optical axis of any of the light-emitting lenses in the B section of the light-emitting lens array, wherein, in the first section of the light-incident lens array, the entire light-incident lenses arranged on a common vertical column have a common horizontal width, wherein, in the light-incident lens array, the plurality of light-incident lenses in the first and second sections have the same horizontal width, and wherein, in the light-incident lens array, the plurality of light-incident lenses in the first section has a radius of curvature different from that of the plurality of light-incident lenses in the second section.

* * * * *